(12) United States Patent
Tanzawa et al.

(10) Patent No.: US 11,119,564 B2
(45) Date of Patent: *Sep. 14, 2021

(54) INFORMATION PROCESSING APPARATUS, METHOD FOR INFORMATION PROCESSING, AND GAME APPARATUS FOR PERFORMING DIFFERENT OPERATIONS BASED ON A MOVEMENT OF INPUTS

(71) Applicant: KABUSHIKI KAISHA SQUARE ENIX, Tokyo (JP)

(72) Inventors: Yuuichi Tanzawa, Shinjuku-ku (JP); Daisuke Miyata, Chiyoda-ku (JP); Yoshimasa Asao, Chiyoda-ku (JP); Tetsuro Uchida, Chiyoda-ku (JP); Kazuya Tomii, Chiyoda-ku (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,143

(22) Filed: Jul. 19, 2019

(65) Prior Publication Data

US 2019/0339765 A1 Nov. 7, 2019

Related U.S. Application Data

(63) Continuation of application No. 15/688,146, filed on Aug. 28, 2017, now Pat. No. 10,831,258, which is a
(Continued)

(30) Foreign Application Priority Data

May 23, 2012 (JP) .................................. 2012-117972

(51) Int. Cl.
*G06F 3/01* (2006.01)
*A63F 13/426* (2014.01)
(Continued)

(52) U.S. Cl.
CPC ............ *G06F 3/01* (2013.01); *A63F 13/2145* (2014.09); *A63F 13/426* (2014.09);
(Continued)

(58) Field of Classification Search
CPC ........ A63F 13/00; A63F 13/06; A63F 13/214; A63F 13/2145; A63F 13/42;
(Continued)

(56) References Cited

U.S. PATENT DOCUMENTS 7,254,775 B2 * 8/2007 Geaghan ............... G06F 3/0488
715/701
8,062,115 B2 * 11/2011 Thomas .............. G07F 17/3209
463/16
(Continued)

FOREIGN PATENT DOCUMENTS

| EP | 1 852 774 | 11/2007 |
|----|-----------|---------|
| EP | 2 254 032 | 11/2010 |
| JP | 2010-020608 | 1/2010 |

OTHER PUBLICATIONS

U.S. Appl. No. 13/633,401 to Yuuichi Tanzawa et al., filed Oct. 2, 2012.
(Continued)

*Primary Examiner* — Chase E Leichliter
(74) *Attorney, Agent, or Firm* — Greenblum & Bernstein, P.L.C.

(57) ABSTRACT

An apparatus and method for providing a touch operation is provided. The apparatus includes a display to display an image, a coordinate input to input a coordinate on a display screen of the display, and a processor to execute a process. The process including determining first input detected as a first specifying operation specifying an area on a display screen. The process also includes determining, when a second input is detected and the first input is continuously
(Continued)

detected, the first and the second inputs as a second specifying operation. Also, the process includes determining, when one of the first and the second inputs is discontinued after determining the second specifying operation, a continuing and remaining input as the first specifying operation which treats the continuing and remaining input as the first input.

11 Claims, 9 Drawing Sheets

Related U.S. Application Data continuation of application No. 13/748,937, filed on Jan. 24, 2013, now abandoned.

(51) Int. Cl.
- *A63F 13/2145* (2014.01)
- *A63F 13/822* (2014.01)
- *G06F 3/0488* (2013.01)
- *G06F 3/0481* (2013.01)

(52) U.S. Cl.
CPC .......... *A63F 13/822* (2014.09); *G06F 3/0481* (2013.01); *G06F 3/0488* (2013.01); *G06F 2203/04808* (2013.01)

(58) Field of Classification Search
CPC .. A63F 13/426; A63F 2300/1075; G06F 3/01; G06F 3/0488; G06F 2203/04808
USPC ...................................... 463/36, 37
See application file for complete search history.

(56) References Cited

U.S. PATENT DOCUMENTS

| | | | | |
|---|---|---|---|---|
| 8,222,507 | B1* | 7/2012 | Salazar | G10H 1/0033 84/602 |
| 8,246,459 | B2* | 8/2012 | Ryu | A63F 13/814 463/36 |
| 8,269,736 | B2* | 9/2012 | Wilairat | G06F 3/04883 345/173 |
| 8,512,115 | B2* | 8/2013 | Namba | A63F 13/42 463/4 |
| 8,519,965 | B2* | 8/2013 | Cady | G06F 3/04166 345/173 |
| 8,954,890 | B2* | 2/2015 | Haussila | G06F 3/04845 715/834 |
| 9,146,674 | B2* | 9/2015 | Karlsson | G06F 3/04883 |
| 9,317,197 | B2* | 4/2016 | Takuma | G06F 3/0488 |
| 2003/0017863 | A1* | 1/2003 | Takahashi | A63F 13/5375 463/3 |
| 2004/0248650 | A1* | 12/2004 | Colbert | A63F 13/08 463/37 |
| 2005/0057524 | A1* | 3/2005 | Hill | G06F 3/0486 345/173 |
| 2005/0202869 | A1* | 9/2005 | Miyamoto | A63F 13/26 463/36 |
| 2005/0227217 | A1* | 10/2005 | Wilson | G06K 9/20 434/337 |
| 2006/0010400 | A1* | 1/2006 | Dehlin | G06F 3/0421 715/856 |
| 2006/0025218 | A1* | 2/2006 | Hotta | A63F 13/06 463/37 |
| 2006/0097991 | A1* | 5/2006 | Hotelling | G06F 3/0412 345/173 |
| 2006/0112335 | A1* | 5/2006 | Hofmeister | G06F 3/0488 715/701 |
| 2006/0197753 | A1* | 9/2006 | Hotelling | G06F 3/0412 345/173 |
| 2006/0258453 | A1* | 11/2006 | Kando | A63F 13/52 463/36 |
| 2007/0252821 | A1* | 11/2007 | Hollemans | G06F 3/0488 345/173 |
| 2008/0132333 | A1* | 6/2008 | Kogo | G07F 17/3211 463/37 |
| 2008/0165141 | A1* | 7/2008 | Christie | G06F 3/0482 345/173 |
| 2008/0180406 | A1* | 7/2008 | Han | G06F 3/04883 345/173 |
| 2008/0274780 | A1* | 11/2008 | Yamada | A63F 13/70 463/11 |
| 2008/0297482 | A1* | 12/2008 | Weiss | G06F 3/041 345/173 |
| 2008/0297492 | A1* | 12/2008 | Shirakawa | A63F 13/426 345/179 |
| 2009/0051114 | A1* | 2/2009 | Robbers | A63F 1/00 273/293 |
| 2009/0054124 | A1* | 2/2009 | Robbers | G07F 17/3293 463/9 |
| 2009/0122018 | A1* | 5/2009 | Vymenets | G06F 3/0488 345/173 |
| 2010/0053093 | A1* | 3/2010 | Kong | G06F 3/045 345/173 |
| 2010/0066704 | A1* | 3/2010 | Kasai | G06F 3/0418 345/175 |
| 2010/0083111 | A1* | 4/2010 | de los Reyes | G06F 3/04886 715/702 |
| 2010/0141680 | A1* | 6/2010 | Nashida | G06F 3/04883 345/642 |
| 2010/0162181 | A1* | 6/2010 | Shiplacoff | G06F 3/04883 715/863 |
| 2010/0277419 | A1* | 11/2010 | Ganey | G06F 3/04845 345/173 |
| 2010/0285881 | A1* | 11/2010 | Bilow | A63F 9/24 463/37 |
| 2010/0287486 | A1* | 11/2010 | Coddington | G06F 40/232 715/769 |
| 2010/0321319 | A1* | 12/2010 | Hefti | G06F 3/04883 345/173 |
| 2011/0009195 | A1* | 1/2011 | Porwal | A63F 13/426 463/37 |
| 2011/0014983 | A1* | 1/2011 | Miller, IV | G06F 3/0488 463/37 |
| 2011/0130182 | A1* | 6/2011 | Namba | A63F 13/42 463/3 |
| 2011/0169762 | A1* | 7/2011 | Weiss | G06F 3/04883 345/173 |
| 2011/0172013 | A1* | 7/2011 | Shirasaka | A63F 13/92 463/37 |
| 2011/0205169 | A1* | 8/2011 | Yasutake | G06F 3/03547 345/173 |
| 2012/0026100 | A1* | 2/2012 | Migos | G06F 3/0412 345/173 |
| 2012/0034978 | A1* | 2/2012 | Lim | A63F 13/235 463/36 |
| 2012/0050262 | A1* | 3/2012 | Kim | H04N 13/156 345/419 |
| 2012/0066627 | A1* | 3/2012 | Furukawa | G06F 3/0488 715/768 |
| 2012/0179963 | A1* | 7/2012 | Chiang | G06F 3/04883 715/702 |
| 2012/0212420 | A1* | 8/2012 | Shin | G06F 3/04886 345/173 |
| 2012/0218203 | A1* | 8/2012 | Kanki | G06F 3/0416 345/173 |
| 2012/0306775 | A1* | 12/2012 | Miyachi | G06F 3/03545 345/173 |
| 2012/0322557 | A1 | 12/2012 | Tanzawa | |
| 2013/0038532 | A1* | 2/2013 | Okura | A63F 13/40 345/158 |
| 2013/0058019 | A1* | 3/2013 | Lee | G06F 3/04883 361/679.01 |
| 2013/0120258 | A1* | 5/2013 | Maus | A63F 13/245 345/161 |
| 2013/0120293 | A1* | 5/2013 | Jeon | G06F 3/01 345/173 |

(56) References Cited

U.S. PATENT DOCUMENTS

| | | | | |
|---|---|---|---|---|
| 2013/0120295 A1* | 5/2013 | Kim | G06F 3/0481 | 345/173 |
| 2013/0139079 A1* | 5/2013 | Kitao | G06F 3/041 | 715/764 |
| 2013/0141373 A1* | 6/2013 | Takuma | G06F 3/0488 | 345/173 |
| 2013/0154959 A1* | 6/2013 | Lindsay | G06F 3/0488 | 345/173 |
| 2013/0167062 A1* | 6/2013 | Herring | G06F 3/04883 | 715/773 |
| 2013/0169559 A1* | 7/2013 | Peng | G06F 3/0416 | 345/173 |
| 2013/0205208 A1* | 8/2013 | Kim | G11B 27/34 | 715/716 |
| 2013/0215059 A1* | 8/2013 | Lim | G06F 3/04883 | 345/173 |
| 2013/0263029 A1* | 10/2013 | Rossi | G06F 3/04883 | 715/764 |
| 2013/0275868 A1* | 10/2013 | Haussila | G06F 3/04845 | 715/702 |
| 2013/0285924 A1* | 10/2013 | Griffin | G06F 3/04812 | 345/173 |
| 2013/0316813 A1* | 11/2013 | Derome | A63F 13/2145 | 463/31 |
| 2013/0316829 A1* | 11/2013 | Derome | A63F 13/218 | 463/37 |
| 2013/0321340 A1* | 12/2013 | Seo | H04M 1/724 | 345/174 |
| 2013/0331182 A1* | 12/2013 | Tanzawa | A63F 13/56 | 463/31 |
| 2015/0113477 A1* | 4/2015 | Haussila | A63F 13/2145 | 715/810 |
| 2015/0169067 A1* | 6/2015 | Hong | G06F 3/04842 | 715/863 |
| 2018/0161674 A1* | 6/2018 | Kohara | A63F 13/92 | |
| 2020/0155941 A1* | 5/2020 | Ito | A63F 13/533 | |

OTHER PUBLICATIONS

U.S. Appl. No. 13/753,938 to Yuuichi Tanzawa et al., filed Jan. 30, 2013.

Blizzard Entertainment, WarCraft II: Battle. Net Edition Manual, Dec. 9, 1995, p. 14 (Grouping Units).

Blizzard Entertainment, StarCraft Manual, Mar. 31, 1998, p. 20 (Grouping Units).

Extended European Search Report for EP 13 15 2033.0 dated May 2, 2016.

Benko H. et al.: "Precise Selection Techniques for Multi-Touch Screens", CHI 2006 Proceedings, Apr. 22, 2006, pp. 1263-1272.

* cited by examiner

INFORMATION PROCESSING APPARATUS, METHOD FOR INFORMATION PROCESSING, AND GAME APPARATUS FOR PERFORMING DIFFERENT OPERATIONS BASED ON A MOVEMENT OF INPUTS

This is a continuation application of U.S. patent application Ser. No. 15/688,146, filed Aug. 28, 2017, which is a Continuation of U.S. patent application Ser. No. 13/748,937, filed Jan. 24, 2013, which claims priority to Japanese Application No. 2012-117972, filed May 23, 2012. The disclosure of these documents, including the specifications, drawings, and claims, are incorporated herein by reference in their entirety.

TECHNICAL FIELD

The present invention relates to an information processing apparatus, a method for information processing, and a game apparatus which can specify an area on a display screen. More specifically, the present invention relates to, for example, an information processing apparatus which can perform processing of selecting one or a plurality of objects included in, for example, a specified area by specifying the area on a display area.

BACKGROUND ART

Conventionally, a technique of specifying a rectangular area by sliding an input position on a display screen using a pointing device such as a touch screen and a mouse pointer is well known. Thus, by specifying a rectangular area on a display screen, it is possible to select one or a plurality of objects included in the specified area, or to enlarge, cut or edit an image in the specified area. According to such a conventional technique, a pointing device generally performs a touch input (click input) of one point on a display screen, slides (swipes) a touch position while continuing the touch input on the screen, and then releases the touch input to specify a rectangular area a diagonal line of which is a line segment connecting a first touch position and a last touch position.

Further, Patent Literature 1 discloses, for example, a technique of using a plurality of objects on a screen using a touch panel display. According to the technique disclosed in Patent Literature 1, a touch state is detected when touch control of the touch panel display arranged overlaid in front of a monitor which can display a plurality of objects is performed, a size of a selection area which defines a range to select objects is determined according to the detected touch state, the selection area is set based on the touch position, and objects at least part of which overlap the set selection area are used as selection candidates.

CITATION LIST

Patent Literature

Patent Literature 1: JP 2010-20608 A

SUMMARY OF INVENTION

Technical Problem

By the way, in recent years, touch panel displays can be made larger, and usage thereof is diversifying. For example, a game apparatus is also being developed which displays a game image on a touch panel display and enables a user to perform an inputting operation related to game progress by performing touch control of a touch panel by the finger. Particularly, by mounting a large touch panel display on a game apparatus and executing an action game, it is possible to provide a game of realistic sensation to users.

When an action game is provided using such a large touch panel display, users need to incessantly perform touch control. A method of touch control of a touch panel display includes, for example, an operation of touching one point of a screen of the touch panel display, an operation of tracing the screen by the finger or an operation of tapping the screen by the finger. The operations are assigned different commands (instructions), and a user advances a game by selecting these operating methods and repeatedly inputting various commands. Particularly, according to a game apparatus which advances a game by selecting a plurality of objects displayed on a display screen, upon selection of an object, if a user desires to select one object, the user touches one point on the screen which displays this object and, if the user selects a plurality of objects, the user touches the screen which displays the respective objects.

Meanwhile, when the user desires to select multiple objects from the objects displayed on the screen, touching the objects which the user desires to select one by one is troublesome and undermines operability of a game. Hence, a technique of, when a touch state of one point on a touch panel display continues, determining a selection area based on a trace on the screen on which a user's finger slides and selecting an object included in this selection area is also proposed.

However, according to the technique disclosed in Patent Literature 1, not only an operation of selecting one object but also an operation of selecting a plurality of objects are basically performed based on a touch state of one finger. Thus, the operation of selecting one object and the operation of selecting a plurality of objects are distinguished based only on whether or not a touch state of one finger continues, and therefore there is a problem that users are easily to make mistakes of touch control. That is, if that a touch state on the touch panel display continues is detected by mistake irrespectively of a user's intension of selecting one object, there is a problem that unintentional another object is selected. By contrast with this, if that a touch state on the touch panel display continues is not detected by mistake irrespectively of a user's intension of selecting a plurality of objects, there is a problem that only one object is selected. Further, when an operation of tracing a screen of a touch panel display by one finger (an operation of sliding the finger) is assigned another command, a user is more likely to make an error operation.

Hence, a technique is currently demanded which can prevent a user's error operation by effectively distinguishing an inputting operation of specifying an area on a display screen from a touching or click inputting operation of specifying one point and an operation of performing sliding while continuing inputting one point. Particularly, when a game which requires an operation of incessantly touching a large touch panel display is assumed, a technique is demanded which relates to an inputting operation of easily specifying a wide range of an area on the display screen by one hand.

Solution to Problem

Hence, the inventors of the present invention obtained knowledge as a result of devoted study of means for solving the above problem of the conventional invention that, by fixing a predetermined area on the display screen based on an intermediate coordinate calculated from coordinates of two points simultaneously inputted first to a coordinate input unit and an intermediate coordinate calculated from coordinates of two points simultaneously inputted last to the coordinate input unit, it is possible to effectively distinguish an inputting operation of specifying an area on the display screen from a touching or click inputting operation of specifying one point and an operation of performing sliding while continuing inputting one point. Moreover, the inventors obtained knowledge that the above operating method can easily specify a wide range of an area on the display screen by one hand. Further, the inventors of the present invention reached to solving the problem of the conventional technique based on the above knowledge, and made the present invention.

More specifically, the present invention employs the following configuration.

A first aspect of the present invention relates to an information processing apparatus.

The information processing apparatus according to the present invention has: a display unit $1$ which can display an image; a coordinate input unit $2$ which receives an input of a coordinate on a display screen of the display unit $1$; and an area specifying unit $3$ which specifies an area R on the display screen of the display unit $1$ based on the coordinate inputted to the coordinate input unit $2$.

The area specifying unit $3$ first determines a coordinate of a first intermediate point M1 calculated from coordinates of first two points based on the coordinates of the first two points simultaneously inputted to the coordinate input unit.

Further, the area specifying unit $3$ determines a coordinate of a second intermediate point M2 calculated from coordinates of last two points based on the coordinates of the last two points detected immediately before coordinates of two points stop being simultaneously inputted.

Furthermore, the area specifying unit $3$ fixes the area R on the display screen of the display unit $1$ based on the coordinate of the first intermediate point M1 and the coordinate of the second intermediate point M2.

According to the above configuration, by calculating a first intermediate coordinate of one point from the coordinates of the two points simultaneously inputted first and a second intermediate coordinate from the coordinates of the two points simultaneously inputted last, the information processing apparatus according to the present invention defines the area on the display screen based on the first intermediate coordinate and the second intermediate coordinate. Thus, the present invention requires that an inputting operation of specifying an area on the display screen is an operation of simultaneously inputting coordinates of two points to the coordinate input unit, so that it is possible to effectively distinguish an inputting operation of specifying the area on the display screen from a touching or click inputting operation of specifying, for example, one point and an operation of performing sliding while continuing inputting one point. Consequently, according to the present invention, it is possible to prevent a user's error operation.

Further, when, for example, a touch panel display is assumed, the present invention can obtain the first intermediate coordinate from touch positions of two fingers, obtain a second intermediate coordinate from touch positions released after the two fingers slide, and define the area on the display screen based on these first intermediate coordinate and second intermediate coordinate, so that the user can easily specify a wide range of an area on the display screen by one hand.

Thus, the present invention proposes a new operating method of the information processing apparatus which has the display unit and a coordinate input unit. According to the present invention, it is possible to improve operability of the information processing apparatus.

In the information processing apparatus according to the present invention, the display unit $1$ may be able to display a plurality of objects O on the display screen. In this case, the information processing apparatus according to the present invention preferably further has an object selecting unit $4$ which selects one or the plurality of objects O at least part of which is included in the area R specified by the area specifying unit $3$.

In view of the above configuration, usage of specifying an area on the display screen by means of the area specifying unit according to the present invention is selecting one or a plurality of objects included in the specified area. To select one object displayed on the screen, for example, a portion at which a desired object is displayed needs to be touched or clicked and inputted by a pointing device as conventionally performed. Further, to select a plurality of objects displayed on the screen, a predetermined area needs to be determined based on the first intermediate coordinate and the second coordinate according to the operating method of the present invention to include a desired object in this predetermined area. By this means, the user can easily distinguish an operation of selecting one object from an operation of selecting a plurality of objects.

In the information processing apparatus according to the present invention, the display unit $1$ and the coordinate input unit $2$ preferably form a touch panel display $10$ with the coordinate input unit $2$ overlaid in front of the display unit $1$. The touch panel display $10$ is an apparatus which detects a point on the coordinate input unit $2$ which the user's hand and finger contacts as a coordinate on the screen of the display unit $1$.

In view of the above configuration, by forming the touch panel display using the display unit and the coordinate input unit, the user can specify a predetermined area on the display area by an intuitive operation.

In the present invention, the area R may be, for example, a polygonal area a diagonal line of which is a line segment connecting the first intermediate point M1 and the second intermediate point M2, a circular area a diameter of which is the line segment connecting the first intermediate point M1 and the second intermediate point M2, and an elliptical area a major axis or a minor axis of which is the line segment connecting the first intermediate point M1 and the second intermediate point M2.

A second aspect of the present invention relates to a method for information processing executed by the information processing apparatus according to the first aspect.

That is, the method for information processing according to the present invention specifies an area on a display screen of the display unit $1$ based on a coordinate detected by the coordinate input unit $2$ which receives an input of the coordinate on the display screen of the display unit $1$.

The method for information processing according to the present invention first performs a step of determining a coordinate of the first intermediate point M1 calculated from coordinates of first two points based on the coordinates of the first two points simultaneously inputted to the coordinate input unit $2$.

Next, the method for information processing according to the present invention performs a step of determining a coordinate of the second intermediate point M2 calculated from coordinates of last two points based on the coordinates of the last two points detected immediately before coordinates of two points stop being simultaneously inputted.

Further, the method for information processing according to the present invention performs a step of defining the area R on the display screen of the display unit 1 based on the coordinate of the first intermediate point M1 and the coordinate of the second intermediate point M2.

A third aspect of the present invention relates to a game apparatus.

A game apparatus according to the present invention has: a touch panel display 100; a card reader 200; and a game body 300 which advances a game by displaying information read by the card reader 200 and displaying the information on the touch panel 100.

The touch panel display 100 has: a display 110 which can display an image; and a touch screen 120 which is overlaid in front of the display 110 and through which a coordinate on a display screen is inputted.

The card reader 200 has: a panel 210 on which a card with a code having predetermined card information printed thereon is set; and an image sensor 230 which reads the code of the card set on the panel 210 and detects the card information.

Further, the game body 300 has: a game information memory unit 380 which stores information related to an object O in association with the card information; an image processing unit 330 which reads the information related to the object O from the game information memory unit 380 based on the card information detected by the image sensor 230 of the card reader 200, and performs control of displaying an image of the read object O on the display 110 of the touch panel display 100; and a game processing unit 320.

The game processing unit 320 first determines a coordinate of the first intermediate point M1 calculated from coordinates of first two points based on the coordinates of the first two points simultaneously inputted to the touch screen 120 of the touch panel display 100. Further, the game processing unit 320 determines a coordinate of the second intermediate point M2 calculated from coordinates of last two points based on the coordinates of the last two points detected immediately before coordinates of two points stop being simultaneously inputted. Furthermore, the game processing unit 320 specifies the area R on the display screen of the display 110 based on the coordinate of the first intermediate point M1 and the coordinate of the second intermediate point M2. Still further, the game processing unit 320 selects one or a plurality of objects (O) an image of which is displayed such that at least part of one or the plurality of objects is included in the specified area R to advance a game.

In view of the above configuration, the game apparatus according to the present invention has the card reader and the touch panel mounted thereon, and advances a game by combining these operations. For example, a user of the game operates by one hand a card set on the card reader to display one or a plurality of objects on the touch panel display, and performs touch control of the touch panel display by the other hand to select the displayed object. Thus, the game apparatus which requires selection of an object by operating the touch panel display by one hand can improve operability of games by adopting the above object selecting operation.

Advantageous Effects of Invention

According to the above configuration, by calculating a first intermediate coordinate of one point from the coordinates of the two points simultaneously inputted first and a second intermediate coordinate from the coordinates of the two points simultaneously inputted last, the area on the display screen is defined based on the first intermediate coordinate and the second intermediate coordinate. Thus, the present invention requires that the inputting operation of specifying the area on the display screen is an operation of simultaneously inputting coordinates of two points to a coordinate input unit. Consequently, the present invention can effectively distinguish an inputting operation of specifying the area on the display screen from a touching or click inputting operation of specifying one point and an operation of performing sliding while continuing inputting one point.

Further, when, for example, a touch panel display is assumed, the present invention can obtain the first intermediate coordinate from touch positions of two fingers, obtain a second intermediate coordinate from touch positions released after the two fingers slide, and define the area on the display screen based on these first intermediate coordinate and second intermediate coordinate. Consequently, according to the present invention, the user can easily specify a wide range of an area on the display screen by one hand.

DESCRIPTION OF EMBODIMENTS

An embodiment for implementing the present invention will be described below with reference to the drawings. The present invention is by no means limited to the embodiment described below, and incorporates embodiments obtained by adequately modifying the following embodiment in a range obvious for one of ordinary skill in art.

(1. Information Processing Apparatus and Method for Information Processing)

First, a basic configuration of an information processing apparatus according to the present invention will be described. The information processing apparatus according to the present invention can specify a predetermined area on a display screen, and perform various information processing of the specified predetermined area. For example, the information processing apparatus according to the present invention can select one or a plurality of objects included in the predetermined area of the specified display screen and move a position of the selected object, that is, give an arbitrary command to the selected object. Further, for example, the information processing apparatus according to the present invention can perform editing processing of, for example, specifying an image included in the predetermined area on the display screen and enlarging and displaying the image in the area or cutting the image in the area. However, use of the predetermined area specified by the present invention is by no means limited to these.

The information processing according to the present invention will be described below using an embodiment as an example where one or a plurality of objects included in the specified predetermined area on the display screen are selected.

Figure 1:
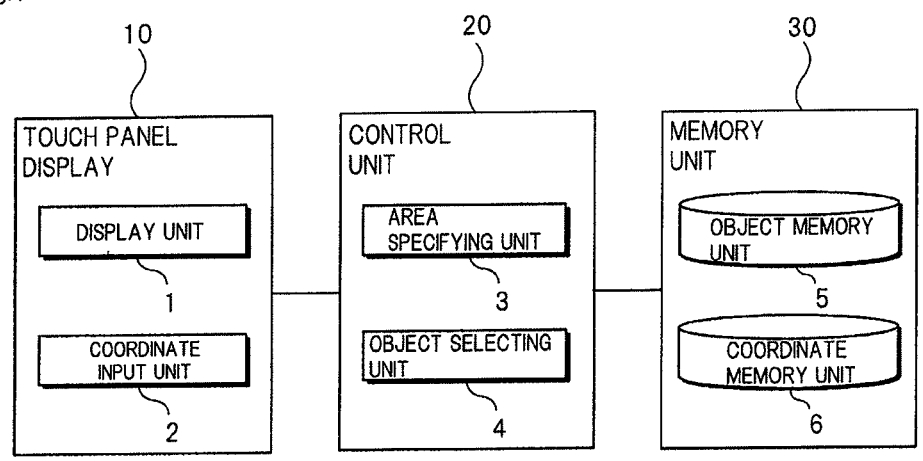
FIG. 1 is a functional block diagram illustrating an information processing apparatus according to the present invention.

FIG. 1 is a block diagram illustrating a basic functional configuration of the information processing apparatus according to the present invention. As illustrated in FIG. 1, the information processing apparatus according to the present invention has a touch panel display 10, a control unit 20 and a memory unit 30.

The touch panel display 10 is configured to display various items of image data as an image which a user can view, and detect a coordinate which the user touched on a display screen. More specifically, the touch panel display 10 is formed by disposing a coordinate input unit 2 formed using a transparent material, in front of a display unit 1 which can display images. The display unit 1 is a display apparatus such as a LCD (Liquid Crystal Display) or an OELD (Organic Electro Luminescence Display). The display unit 1 outputs and displays various pieces of information which the user requires to use the information processing apparatus, as a still image or a movie according to an input signal from the control unit 20. Further, the coordinate input unit 2 can detect that the user's hand or finger contact according to a known electrostatic capacitance method, electromagnetic induction method, infrared scan method, resistance film method or ultrasonic surface acoustic wave method, and obtain coordinate information. A positional relationship between the display unit 1 and the coordinate input unit 2 is mutually linked, and the coordinate input unit 2 can obtain coordinate information about a touch position on a display screen displayed on the display unit 1. By this means, the coordinate input unit 2 can detect contact of the user's finger, and obtain the information about the coordinate on the screen of the display unit 1 which the user's finger contacted. The coordinate input unit 2 supports so-called multitouch of, when, for example, the user touches a plurality of points, acquiring information about coordinates of a plurality of these points.

With the operating method according to the present invention, the user can easily specify a wide range of an area on the display screen by one hand. Consequently, the information processing apparatus according to the present invention can have the comparatively large touch panel display 10 mounted thereon. For example, the touch panel display 10 is preferably displays of 10 inches to 75 inches, 16 inches to 40 inches or 20 inches to 38 inches.

Meanwhile, in the present invention, the display unit 1 and the coordinate input unit 2 are by no means limited to a display which functions as a touch panel display integrally formed with the display unit 1 and the coordinate input unit 2. For example, the display unit 1 and the coordinate input unit 2 may function as separate hardware. In this case, a normal display apparatus such as an LCD or an OELD may be used for the display unit 1. Further, the coordinate input unit 2 may be a pointing device such as a mouse or a touch tablet which is provided separately from the display unit 1.

The control unit 20 controls the entire operation of the information processing apparatus by reading and executing a control program stored in the memory unit 30. The control unit 20 executes a function by means of, for example, a CPU (Central Processing Unit) or a GPU (Graphics Processing Unit). The control unit 20 reads information including image data of an object from the memory unit 30, generates an image of the object and has the touch panel display 10 display the image. Further, the control unit 20 stores coordinate information about the touch position detected by the touch panel display 10, in the memory unit 30. The control unit 20 can perform computation of specifying a predetermined area on the display screen based on the coordinate information inputted to the touch panel display 10. Further, the control unit 20 can decide whether or not an object is selected by analyzing position information of the object displayed on the touch panel display 10 and the coordinate information inputted to the touch panel display 10.

As illustrated in FIG. 1, the control unit 20 has an area specifying unit 3 and an object selecting unit 4 from the functional view point. The area specifying unit 3 has a function of specifying a selection area on the display screen of the touch panel display 10 according to the control program stored in the memory unit 30. Further, the object selecting unit 4 has a function of, when the touch position detected by the touch panel display 10 overlaps an object or when the selection area specified by the area specifying unit 3 includes an object, selecting these objects. Details will be described below.

The memory unit 30 stores various pieces of information including the control program required for processing in the information processing apparatus. The memory unit 30 is realized by a storage apparatus such as a ROM (Read Only Memory) or a RAM (Random Access Memory). The RAM is, for example, a VRAM (Video RAM), a DRAM (Dynamic RAM) or a SRAM (Static RAM). The memory unit 30 has an object memory unit 5 and a coordinate memory unit 6 from a functional view point. The object memory unit 5 stores information including image data (for example, a top coordinate, a top texture coordinate or brightness data of the object) of the object displayed on the touch panel display 10. The coordinate memory unit 6 stores coordinate information acquired by the coordinate input unit 2 of the touch panel display 10. The coordinate memory unit 6 stores coordinate information read and written by the control unit 20, and is realized by, for example, a working area of the RAM.

Figure 2:
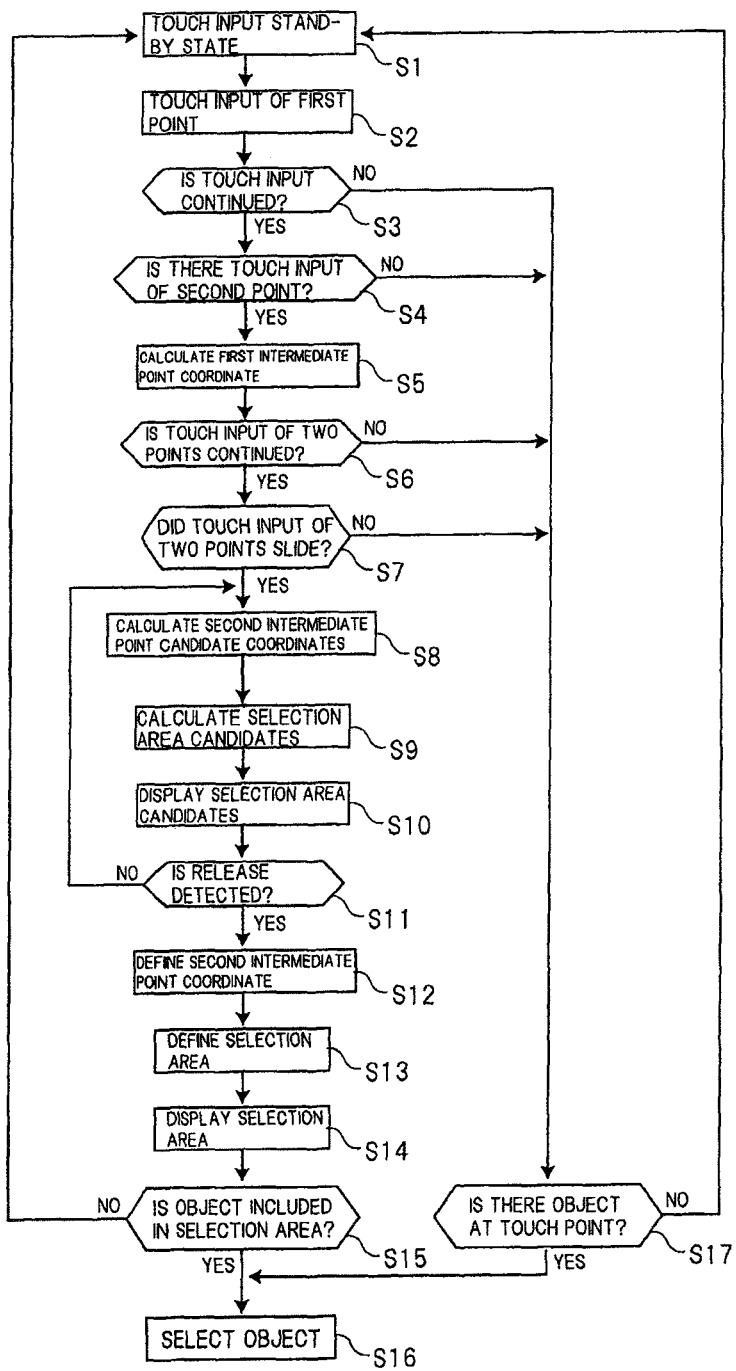
FIG. 2 illustrates a flow of processing executed by the information processing apparatus according to the present invention.
Figure 3:
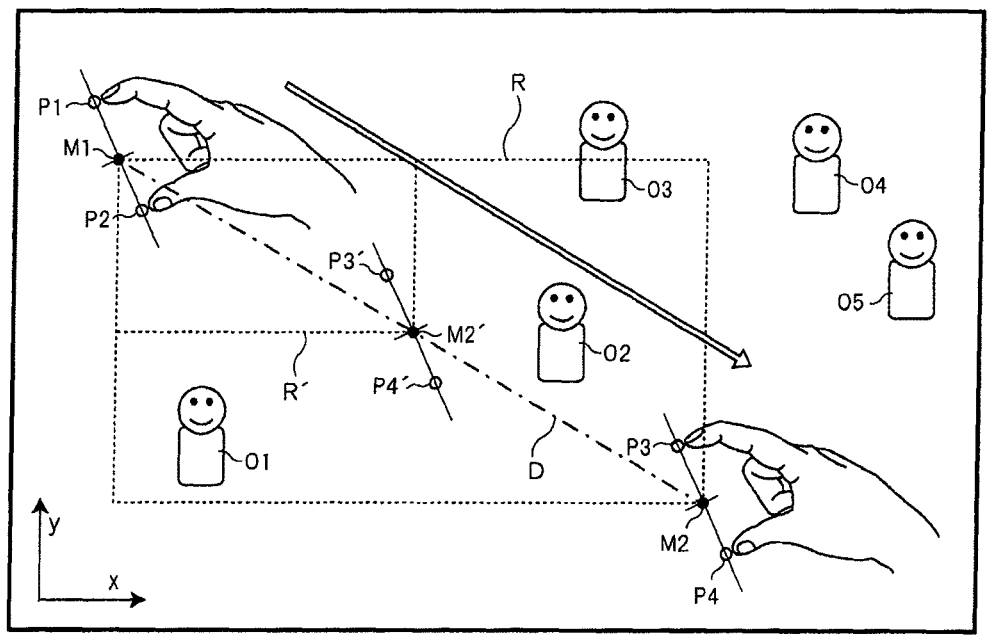
FIG. 3 is a schematic diagram schematically illustrating an object selecting operation.

Subsequently, a flow of information processing executed by the information processing apparatus according to the present invention will be described with reference to FIG. 2. That is, the control unit 20 of the information processing apparatus reads the control program stored in the memory unit 30, and executes processing illustrated in FIG. 2 according to the read control program. FIG. 2 specifically illustrates processing of the control unit 20 of selecting one or a plurality of objects displayed on the touch panel display 10. Further, FIG. 3 is a schematic view illustrating processing of object selection executed by the information processing apparatus.

Step S1 is a touch input stand-by state in which the coordinate input unit 2 of the touch panel display 10 does not detect a touch input. As illustrated in FIG. 3, at this stage, the display unit 1 of the touch panel display 10 displays a plurality of objects O (O1 to O5) read from the object memory unit 5. Naturally, the plurality of objects O (O1 to O5) may be moving on the screen of the display unit 1 or stay still under control of the control unit 20. Further, for example, a background image may be displayed on the screen of the display unit 1 in addition to the objects O.

In step S2, the coordinate input unit 2 of the touch panel display 10 detects a touch input of a first point. As illustrated in FIG. 3, a touch point P1 of the first point is, for example, a point at which a user's forefinger contacts the coordinate input unit 2. When the coordinate input unit 2 detects an input of the touch point P1 of the first point, the control unit 20 acquires information about a coordinate of the touch point P1 of the first point, and temporarily stores the acquired coordinate information in the coordinate memory unit 6.

In step S3, the control unit 20 decides whether or not the touch input of the first point continues, based on the information detected by the coordinate input unit 2. When it is decided that the touch input of the first point continues, the flow proceeds to step S4, and, when it is decided that the touch input of the first point does not continue, the flow proceeds to step S17.

In step S4, the control unit 20 decides whether or not a touch input of a second point is performed while the touch input of the first point continues, based on the information detected by the coordinate input unit 2. As illustrated in FIG. 3, a touch point P2 of the second point is, for example, a point at which the user's thumb contacts the coordinate input unit 2. When the coordinate input unit 2 detects an input of the touch point P2 of the second point, the control unit 20 acquires information about a coordinate of the touch point P2 of the second point, and temporarily stores the acquired coordinate information in the coordinate memory unit 6. When it is decided that the touch input of the second point is performed while the touch input of the first point continues, the flow proceeds to step S5, and, when it is decided that the touch input of the second point is not performed, the flow proceeds to step S17. In addition, in the touch input stand-by state (step S1), when the touch input of the first point and the touch input of the second point are simultaneously detected, processing in steps S2 to S4 are simultaneously performed, and the flow proceeds to step S5.

In step S5, the control unit 20 reads the information about the coordinate of the touch point P1 of the first point and the touch point P2 of the second point from the coordinate memory unit 6, and calculates the coordinate of a first intermediate point M1 based on these pieces of coordinate information. In an example illustrated in FIG. 3, the first intermediate point M1 is set to exactly an intermediate point between the touch point P1 of the first point and the touch point P2 of the second point. That is, the first intermediate point M1 is set to a position at which distances to the touch point P1 of the first point and the touch point P2 of the second point are equal on a line segment connecting the touch point P1 of the first point and the touch point P2 of the second point. Meanwhile, the position to which the first intermediate point M1 is set is not limited to the above, and may be any position as long as the position can be set based on the information about the coordinate of the touch point P1 of the first point and the touch point P2 of the second point. For example, the first intermediate point M1 may be set to a position at which distances to the touch point P1 of the first point and the touch point P2 of the second point are 6:4 on the line segment connecting the touch point P1 of the first point and the touch point P2 of the second point. In addition, the ratio of distances to the touch point P1 of the first point and the touch point P2 of the second point can be arbitrarily set. In addition, the coordinate of the first intermediate point can be set based on coordinate information of the touch point P1 of the first point and the touch point P2 of the second point according to various conditions.

Figure 4:
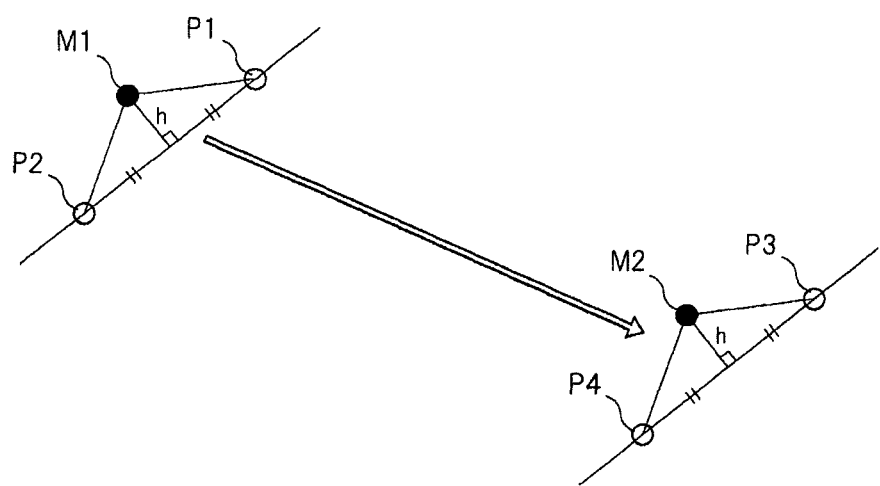
FIG. 4 illustrates an example of a first intermediate point and a second intermediate point calculated from two coordinates.

Further, FIG. 4 illustrates an example of the first intermediate point M1 set under another condition. In an example in FIG. 4, the first intermediate point M1 is provided at a position of a top of an isosceles triangle in which the touch point P1 of the first point and the touch point P2 of the second point are positioned at base angles. That is, as illustrated in FIG. 4, the first intermediate point M1 is set to a position spaced a height h of the isosceles triangle apart from the line segment connecting the touch point P1 of the first point and the touch point P2 of the second point. Thus, by setting the first intermediate point M1 at a position spaced a predetermined distance h apart from the line segment connecting the touch point P1 of the first point and the touch point P2 of the second point, it is possible to provide an advantage that the user can easily view the position of the first intermediate point M1 displayed on the touch panel display 10. That is, if the first intermediate point M1 is set on the line segment connecting the touch point P1 of the first point and the touch point P2 of the second point, there is a problem that the first intermediate point M1 hides behind the user's hand depending on a viewing angle and is hard to view. In this regard, by setting the first intermediate point M1 to a position illustrated in FIG. 4, it is possible to prevent the first intermediate point M1 from being hidden behind the user's hand, so that user can easily learn the position of the first intermediate point M1.

The coordinate of the first intermediate point M1 calculated in step S5 is temporarily stored in the coordinate memory unit 6. When calculation of the coordinate of the first intermediate point M1 is finished, the flow proceeds to step S6.

In step S6, the control unit 20 decides whether or not the touch input of the first point and the touch input of the second point continue, based on information detected by the coordinate input unit 2. When it is decided that the touch inputs of the first point and the second point continue, the flow proceeds to step S7, and, when it is decided that one or both of the touch inputs of the first point and the second point does not continue, the flow proceeds to step S17.

In step S7, the control unit 20 decides whether or not the touch inputs of the two points slide in a state where the touch inputs of the first point and the second point continue. That the touch inputs slide means that detected coordinates of the touch inputs are continuously displaced. To sum up, in step S7, whether or not the user's two fingers (for example, the forefinger and the thumb) move tracing on the screen in a state where the user's two fingers are in contact with the coordinate input unit 2 of the touch panel display 10. The control unit 20 can decide that the touch inputs of two points slide, based on the coordinate information continuously detected by the coordinate input unit 2. The coordinate information which is continuously detected when the touch inputs of two points slide is occasionally stored in the coordinate information memory unit 6. When it is decided that the touch inputs of the two points slide, the flow proceed to step S8, and, when it is decided that one or both of the touch inputs of the first point and the second point do not slide, the flow proceeds to step S17.

In step S8, the control unit 20 reads from the coordinate information memory unit 6 the coordinate information continuously detected when the touch inputs of the two inputs slide, and occasionally calculates coordinates of second intermediate point candidates based on the information about the coordinates of the touch points of the points.

The "second intermediate point" is a point calculated from coordinates of last two points based on the coordinates of the last two points detected immediately before the coordinates of the two points stop being simultaneously inputted. The "second intermediate point candidate" is a point which can be the second intermediate point.

In FIG. 3, a reference numeral P3 refers a touch point (a release point of the forefinger) of a third point detected by the coordinate input unit 2 immediately before the slide input continuing from the touch point P1 of the first point is released, and a reference numeral P4 refers to a touch point (a release point of the thumb) of a fourth point detected by the coordinate input unit 2 immediately before the slide input continuing from the touch point P2 of the second point is released. The coordinate of the "second intermediate point M2" can be calculated from the coordinate of the touch point of the third point and the coordinate of the touch point of the fourth point. Conditions for calculating the coordinate of the second intermediate point M2 may be the same as the conditions for calculating the coordinate of the first intermediate point M1.

Meanwhile, FIG. 3 illustrates that a reference numeral P3' refers to a halfway point at which the slide input is continuing from the touch point P1 of the first point, and a reference numeral P4' refers to a halfway point at which the slide input is continuing from the touch point P2 of the second point. There are a plurality of these halfway points (P3' and P4'), and, when slide inputs continue, the coordinates of the halfway points (P3' and P4') are continuously stored in the coordinate information memory unit 6. Coordinates of the "second intermediate point candidates M2'" are continuously calculated based on these halfway points (P3' and P4'). Conditions for calculating the coordinate of the second intermediate point M2' are the same as the conditions for calculating the coordinate of the second intermediate point M2. The calculated coordinates of the second intermediate point candidates M2' are occasionally stored in the coordinate memory unit 6. When the coordinates of the second intermediate point candidates M2' are calculated, the flow proceeds to step S9.

In step S9, the area specifying unit 3 of the control unit 20 calculates selection area candidates A' based on the above-described coordinate of the first intermediate point M1 and coordinates of the second intermediate point candidates M2'. The selection area candidate A' is an area which can be a selection area A described below. A selection area candidate R' is a rectangular area a diagonal line of which is, for example, a line segment connecting the first intermediate point M1 and the second intermediate point candidate M2'. A shape and an area of the selection area candidate R' change when touch inputs of two points slide and the coordinate of the second intermediate point candidate M2' changes. Hence, the selection area candidates R' are continuously calculated according to changes in the coordinates of the second intermediate point candidates M2'. When the selection area candidates R' are calculated, the flow proceeds to step S10.

In step S10, the control unit 20 displays the selection area candidates R' calculated in step S9, on the touch panel display 10. As described above, the selection area candidates R' are continuously calculated, and displayed on the touch panel display 10 every time the selection area candidate R' is calculated. By this means, the user can check the selection area candidates R' from the display of the touch panel display 10, and can adjust a touch position such that an object which the user desires to select is included in the selection area candidates R'. When the selection area candidates R' are displayed, the flow proceeds to step S11.

In step S11, the control unit 20 decides whether or not slide inputs continuing from the touch point P1 of the first point and the touch point P2 of the second point are released. That is, the control unit 20 may decide that the slide inputs are released when the coordinate input unit 2 no longer detects touch inputs continuing from the touch point P1 of the first point and the touch point P2 of the second point. When it is decided that the slide inputs are released, the flow proceeds to step S12. On the other hand, when it is decided that the slide inputs are continuing without being released, processing in steps S8 to S10 are repeated until release of the slide inputs is detected.

In step S12, the control unit 20 decides the coordinate of the second intermediate point M2. That is, as illustrated in FIG. 3, the control unit 20 acknowledges points detected by the coordinate input unit 2 immediately before the slide inputs are released in step S11 as the touch point P3 of the third point and the touch point P4 of the fourth point. In addition, the touch point P3 of the third point is a touch point detected by the coordinate input unit 6 immediately before the slide input continuing from the touch point P1 of the first point is released. Further, the touch point P4 of the fourth point is a touch point detected by the coordinate input unit 6 immediately before the slide input continuing from the touch point P2 of the second point is released. Furthermore, the control unit 20 calculates the coordinate of the second intermediate point M2 based on the coordinate of the touch point P3 of the third point and the coordinate of the touch point P4 of the fourth point. Conditions for calculating the coordinate of the second intermediate point M2 may be the same as the conditions for calculating the coordinate of the first intermediate point M1. The coordinate of the second intermediate point M2 is stored in the coordinate memory unit 6. When the coordinate of the second intermediate point M2 is calculated, the flow proceeds to step S13.

In step S13, the area specifying unit 3 of the control unit 20 defines a selection area R on the display screen of the touch panel display 10 based on the above coordinate of the first intermediate point M1 and coordinate of the second intermediate point M2. In an example illustrated in FIG. 3, the selection area R is a rectangular (square) area a diagonal line of which is a line segment D connecting the coordinate of the first intermediate point M1 and the second intermediate point M2 and a periphery of which is defined by two sides parallel to a Y axis of the display screen and two sides parallel to the X axis. When the selection area R is specified, the coordinate of each top of the shape of the selection area R is stored in the memory unit 30.

Meanwhile, the shape of the selection area R is not limited to the above, and may have a shape determined based on coordinates of two points of the first intermediate point M1 and the second intermediate point M2. FIG. 5 illustrates an example of the shape of the selection area R which can be determined based on the coordinates of the two points of the first intermediate point M1 and the second intermediate point M2.

Figure 5A:
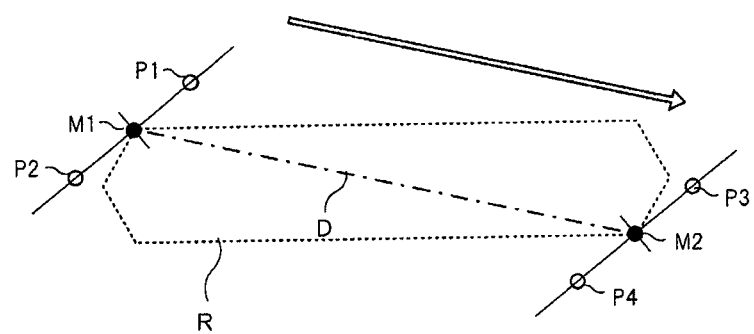
FIGS. 5(*a*), 5(*b*) and 5(*c*) illustrate an example of an area calculated from the coordinates of the first intermediate point and the second intermediate point.

In an example illustrated in FIG. 5(a), the selection area R is a polygonal area a diagonal line of which is the line segment D connecting the coordinate of the first intermediate point M1 and the second intermediate point M2. More specifically, in the example in FIG. 5(a), a selection area A has a hexagonal shape a diagonal line of which is the line segment D connecting the coordinates of the first intermediate point M1 and the second intermediate point M2, and in which a side extending from the first intermediate point M1 in the X axis direction and a side extending from the second intermediate point M2 in the X axis direction are parallel.

Figure 5B:
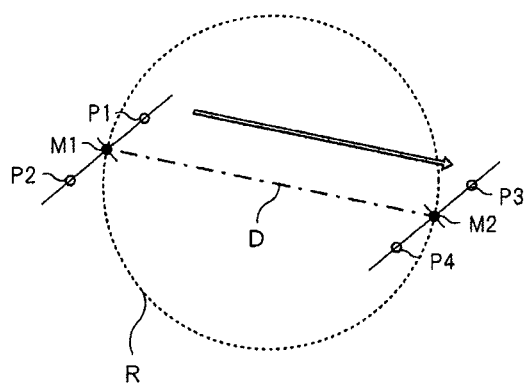

Further, in an example illustrated in FIG. 5(b), the selection area R is a perfect circular area a diameter of which is the line segment D connecting the coordinate of the first intermediate point M1 and the second intermediate point M2.

Figure 5C:
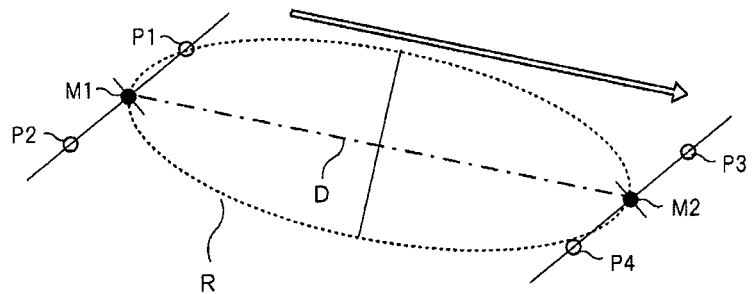

Furthermore, in an example illustrated in FIG. 5(c), the selection area R is an elliptical area a major axis of which is the line segment D connecting the coordinates of the first intermediate point M1 and the second intermediate point M2. In this case, the length of a minor axis of the elliptical area may be a fixed value, or a value proportional to the major axis. Further, although not illustrated, the selection area R may be an elliptical area a minor axis of which is the line segment D connecting the coordinates of the first intermediate point M1 and the second intermediate point M2.

Thus, the shape of the selection area R can be adequately set according to use thereof.

In step S14, the control unit 20 displays the defined selection area R on the touch panel display 10. By this means, the user can check the selection area R based on the display on the touch panel display 10.

In step S15, the object selecting unit 4 of the control unit 20 decides whether or not there is an object in the selection area R on the display screen. Positions at which there is a plurality of objects O displayed on the screen are learned by the control unit 20. Consequently, by referring to the coordinate of each top of the shape of the selection area R on the display screen and the coordinates at which there are the objects O, it is possible to decide whether or not the objects O are included in the selection area R. In the example illustrated in FIG. 3, objects O1 to O5 are displayed on the screen of the touch panel display 10. Among these objects, the objects O1 to O3 are entirely or partially included in the selection area R. On the other hand, the objects O4 and O5 are entirely positioned outside the selection area R. Hence, the object selecting unit 4 of the control unit 20 decides that the objects O1 to O3 among a plurality of objects O1 to O5 are included in the selection area R. When there are objects in the selection area R on the display screen, the flow proceeds to step S16.

Meanwhile, when there is not any object in the selection area R, the flow returns to step S1 and a touch input stand-by state starts again.

In step S16, the object selecting unit 4 of the control unit 20 selects one or a plurality of objects which are decided to be included in the selection area R. Information (for example, an identification number of each object) related to the selected objects is temporarily stored in a working area of the memory unit 30.

Further, as illustrated in FIG. 2, when the touch input of the second point is not performed while the touch input of the first point continues or, even though the touch input of the second point is performed, a simultaneous slide input of the two points is not performed, the flow proceeds to step S17. In this case, in step S17, whether or not an object on the display screen is positioned at the touch point P1 of the first point is decided as conventionally performed. Meanwhile, the coordinates of the touch point P1 of the first point and the coordinate at which there is the object on the display screen are referred to and, when both of the coordinates match, the flow proceeds to step S16.

In step S16, the object selecting unit 4 of the control unit 20 selects one object the coordinate of which matches with the touch point P1 of the first point. The information related to the selected object is temporarily stored in the working area of the memory unit 30.

As described above, the control unit 20 performs processing of selecting one or a plurality of objects of the objects displayed on the touch panel display 10. When the control unit 20 selects an object, by performing a drag operation in a state where the object is selected, for example, it is possible to perform various known information processing of, for example, moving the position of the object on the display screen.

(2. Game Apparatus)

Next, a game apparatus according to the embodiment of the present invention will be described. The game apparatus according to the present invention basically has a touch panel display. Further, the game apparatus can advance a game by selecting one or a plurality of objects displayed on the touch panel display according to the above method, and giving various commands to the selected objects.

[Configuration Example of Game Apparatus]

Figure 6:
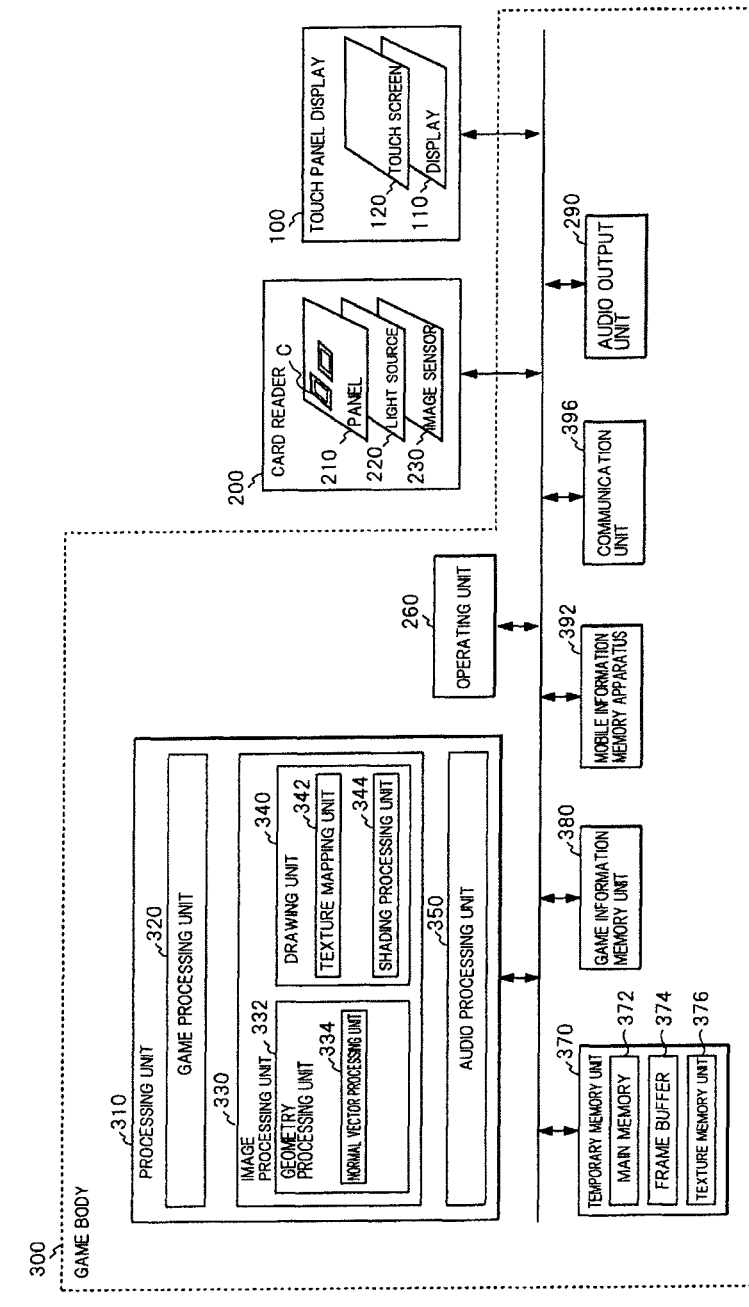
FIG. 6 is a block diagram illustrating a configuration example of a game apparatus according to the present invention.
Figure 7:
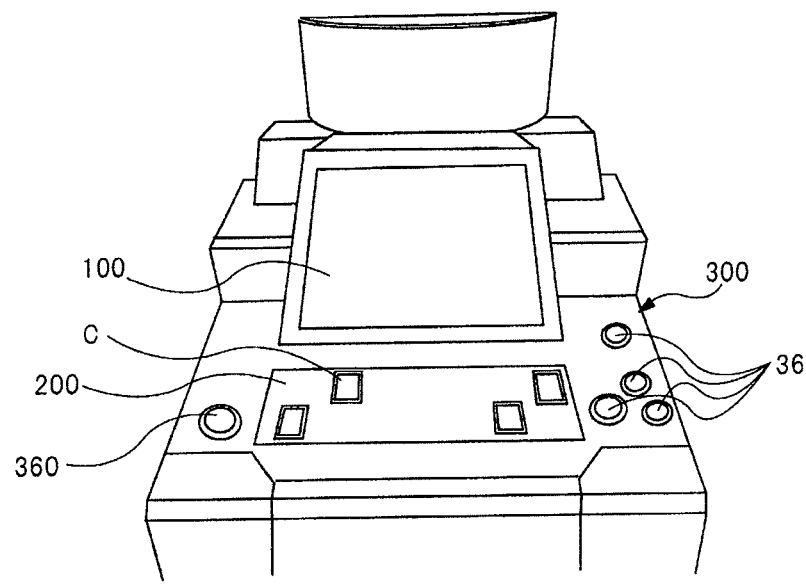
FIG. 7 is a perspective view illustrating an example of an outlook of the game apparatus according to the present invention.

FIG. 6 is a block diagram illustrating a configuration example of the game apparatus. The embodiment illustrated by this block diagram can be suitably used for an arcade game apparatus in particular. FIG. 7 is a perspective view illustrating an example of an outlook of a housing of the game apparatus.

As illustrated in FIG. 6, the game apparatus has the touch panel display 100, a card reader 200 and a game body 300. The touch panel display 100 is configured to display various items of image data as an image which the user can view, and detect the coordinates which the user touches on the display screen. Further, when a card with a predetermined identification code printed thereon is set on the card reader 200, the card reader 200 is configured to read the identification code recorded in the card and acquire unique card information of the card. Furthermore, the game body 300 controls the entire function of the game apparatus. Particularly, the game body 300 can display an object on the touch panel display 100 based on the information read by the card reader 200, and advance a game based on a card operation with respect to the card reader 200 and touch control with respect to the touch panel display 100.

As illustrated in FIG. 6, the touch panel display 100 has the display 110 and the touch screen 120. The touch panel display 100 is formed by disposing the touch screen 120 formed using a transparent material, in front of the display 100 which can display images. The display 110 is a display apparatus such as a LCD (Liquid Crystal Display) or an OELD (Organic Electro Luminescence Display). The display 110 outputs and displays various pieces of information which the user requires to use the information processing apparatus, as a still image or a movie according to an input signal from the game body 300. Further, the touch screen 120 can detect contact of the user's hand or finger according to a known electrostatic capacitance method, electromagnetic induction method, infrared scan method, resistance film method or ultrasonic surface acoustic wave method, and obtain information about the coordinate of the touch position. The positional relationship between the display 110 and the touch screen 120 is mutually linked, and the touch screen 120 can acquire information about the coordinate of a touch position on the display screen displayed on the display 110. By this means, the touch screen 120 can detect contact of the user's finger, and obtain the information about the coordinate on the screen of the display 110 which the user's finger contacted. The coordinate information acquired by the touch screen 120 is stored in a temporary memory unit 370 of the game body 300. Further, the touch screen 120 supports so-called multitouch of, when, for example, the user touches a plurality of points, acquiring information about coordinates of a plurality of these points. Furthermore, the game apparatus according to the present invention preferably has the comparatively large touch panel display 100 mounted thereon. For example, the touch panel display 100 is preferably displays of 10 inches to 75 inches, 16 inches to 40 inches or 20 inches to 38 inches.

As illustrated in FIG. 6, the card reader 200 is an apparatus which can capture an image of an identification card recorded in a card C, and has a panel 210, a light source 220 and an image sensor 230. For example, an illustration of an object used in a game is printed on the surface of the card C, and an identification code for identifying the object printed on the surface is recorded on the back surface of the card C. Further, for example, an identification code is printed on the back surface of the card C using an ink which cannot be viewed by means of visible light, and a pattern printed using black and white appear when specific invisible light is radiated on the card. The identification code is printed using a special ink which absorbs invisible light such as infrared ray and, when infrared ray is radiated on the back surface of the card C, the invisible light radiated on a portion except the black portion of the identification code is reflected. For example, the identification code of the card C has at least an identification number of an object drawn in the card and information related to, for example, an orientation of the cord recorded therein.

The panel 210 is provided on the upper surface of the card reader 200, and a plurality of cards C can be set on the panel 210. Further, inside the housing of the game apparatus, for example, a light source 220 which radiates infrared ray (invisible light) on the back surface of the card C set on the panel 210, and an image sensor 230 which acquires the infrared ray reflected from the back surface of the card C set on the panel 210 and captures an image of a pattern of card data recorded in the card C are provided. The light source 220 is, for example, a light emitting diode (LED) which emits invisible light such as infrared ray or ultraviolet ray which is invisible to the eyes. The image sensor 230 is, for example, an image capturing element which captures an image of an identification code by means of infrared ray which is reflected on the back surface of the card C and is incident on the card reader 200. Further, the card reader 200 can acquire unique card information of the card C by analyzing this identification code. The card information acquired by the card reader 200 is transmitted to a processing unit 310 of the game body 300, and stored in the temporary memory unit 270.

The identification code of the card C has at least an identification number of an object drawn in the card and information related to, for example, an orientation of the card recorded therein. Hence, by referring to an object table stored in the game information memory unit 380 or the temporary memory unit 270 based on the card information acquired from the card reader 200, the processing unit 310 of the game body 300 can learn a status, a type, a name and an attribute of the object recorded in the card C and, moreover, the characteristics of the object matching the orientation or the position of the card C. An example of an object is a game character. Further, the image sensor 230 of the card reader 200 detects the position at which infrared ray light is reflected from the back surface of the card C, so that the processing unit 310 of the game body 300 can calculate the position at which the card C is set on the panel 210 as coordinate information. Furthermore, the image sensor 230 continuously detects reflection positions of infrared ray, so that it is possible to obtain information that the card C set on the panel 210 moves from a certain position to another position.

Figure 8:
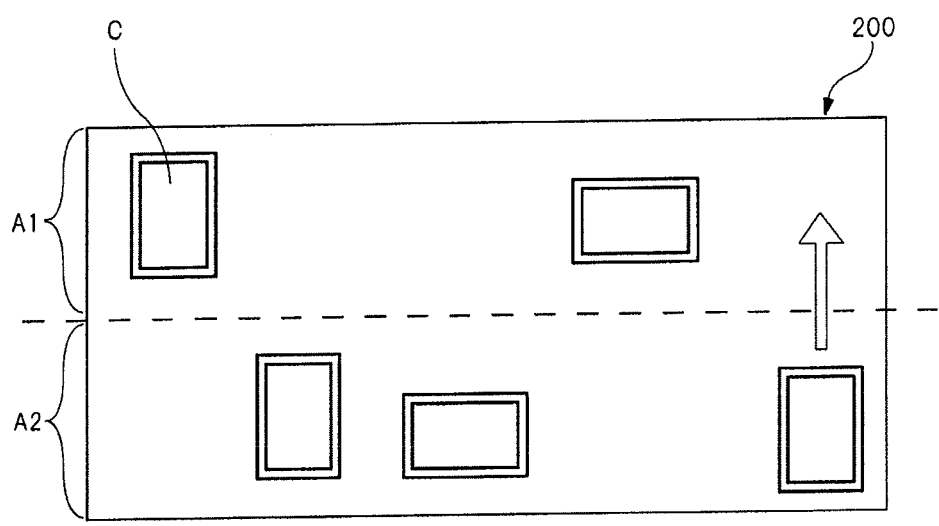
FIG. 8 schematically illustrates a card reader on which a plurality of cards are set.

Still further, as illustrated in FIG. 8, the panel 210 of the card reader 200 is preferably partitioned into a plurality of areas. The number of partitions of the panel 210 is, for example, 2 to 10. In an example illustrated in FIG. 8, the panel 210 of the card reader 200 is divided into two of an offensive area A1 (first area) and a defensive area A2 (second area). These areas are partitioned according to the coordinate of the panel, and each card C can slide in the offensive area A1 and the defensive area A2. By acquiring the position of each card C on the panel 210 as coordinate information, the processing unit 310 of the game body 300 can decide which one of the offensive area A1 and the defensive area A2 the position of each card C belongs to.

Further, as illustrated in FIG. 8, the rectangular card C can be set vertically or horizontally on the panel 210 of the card reader 200, and the processing unit 310 of the game body 300 can decide whether the card C is set vertically or horizontally, based on detection information from the card reader 200. For example, an identification code is printed on the back surface of the card C. This identification code includes information related to the orientation of the card. Consequently, the processing unit 310 of the game body 300 can decide whether the card C is set vertically or horizontally by reading the identification code by means of the card reader 200 and analyzing the orientation of the card C based on the read identification code.

The game body 300 has the processing unit 310, and reads and executes a game program and controls an entire operation of the game apparatus according to the game program. As illustrated in FIG. 6, the game body 300 has the following configuration.

The processing unit 310 performs various processing such as control of the entire system, an instruction to give a command to each block in the system, game processing, image processing and audio processing. The function of the processing unit 310 can be realized by hardware such as various processors (for example, a CPU or a DSP) or an ASIC (for example, a gate array), or a given program (game program).

The processing unit 310 may include a game processing unit 320, an image processing unit 330 and an audio processing unit 350. More specifically, the processing unit 310 includes a main processor, a coprocessor, a geometry processor, a drawing processor, a data processing processor, and a four arithmetic operation circuit or a generalized arithmetic operation circuit. These processors and circuit are adequately coupled through a bus, and can transmit and receive signals. Further, the processing unit 310 may have a data extension processor for extending compressed information.

The game processing unit 320 performs various processing such as processing of displaying an object on the display 110 based on card information acquired by the card reader 200, processing of scrolling the position of a view point (the position of a virtual camera) or an angle of view (a rotation angle of the virtual camera) on the display 110, processing of arranging an object such as a map object in object space, processing of selecting an object, processing of moving the object (motion processing), processing of calculating the position or the rotation angle of the object (the rotation angle around an X, Y or Z axis), processing of receiving coins (price), processing of setting various modes, processing of advancing a game, processing of setting a selection screen, hit check processing, processing of computing a game result (achievement or score), processing of allowing a plurality of players to play a game in common game space or game-over processing, based on input data from the touch screen 120, the card reader 200 and the operating unit 360 and personal data, stored data and a game program from a mobile information storage apparatus 392.

The image processing unit 330 performs various image processing according to, for example, an instruction from the game processing unit 320. The game processing unit 320 reads image information of an object and game space from the game information memory unit 380 based on information about the position of a view point and an angle of view, and writes the read image information in the temporary memory unit 370. The game processing unit 320 supplies scroll data for moving the view point to the image processing unit 330. The image processing unit 330 reads image information per frame from the temporary memory unit 370 based on given scroll data, and has the display 110 display images of the object and the game space according to the read image information. By this means, the display 110 displays the object and the game space based on the view point. Further, the image processing unit 330 moves the view point in the game space according to the coordinate inputted to the touch screen 120. Furthermore, the image processing unit 330 reads frames from the temporary memory unit 370 based on the information about the moving view point, and has the display 110 to display the read image. Thus, by scrolling the view point in the game space, the display screen transitions.

Further, the image processing unit 330 reads the card information acquired from the temporary memory unit 370 by the card reader 200, and refers to the object table stored in a game information memory unit 380 based on this card information. Furthermore, the image processing unit 330 reads image data of the object associated with the card information from the temporary memory unit 370 or the game information memory unit 380 based on link information stored in the object table. Still further, the image processing unit 330 generates the object in the game space according to the image data of the read object, and has the display 110 to display the object.

The game processing unit 320 controls a behavior of the object which appears in the game space, based on the information about the coordinate inputted to the touch screen 120, the orientation or the position of the card set on the card reader 200 and other operation information from the operating unit 260 (a lever, button or a controller). For example, the game processing unit 320 refers to the coordinate information of the object displayed on the display 110 and the coordinate information inputted to the display 110, and decides whether or not the user touches the object. That is, the game processing unit 320 decides that the user touched and selected the object when position information inputted to the touch screen 120 and position information of the object match. Further, when an operation or an instruction is given to the selected object, processing matching a game program is performed according to the operation or the instruction.

Furthermore, the game processing unit 320 preferably performs selection processing unique to the present invention when the object displayed on the display 110 of the touch panel display 100 is selected. That is, the game processing unit 320 determines the coordinate of the first intermediate point calculated from coordinates of first two points based on the coordinates of the first two points simultaneously inputted to the touch screen 120 of the touch panel display 100. Further, the game processing unit 320 determines the coordinate of the second intermediate point calculated from coordinates of last two points based on the coordinates of the last two points detected immediately before the two coordinates of the two points stop being simultaneously inputted. Furthermore, the game processing unit 320 specifies an area on the display screen of the display 110 based on the coordinate of the first intermediate point and the coordinate of the second intermediate point, and selects one or a plurality of objects images of which are displayed such that at least part of the objects are included in the specified area. Still further, when the operation or the instruction is given to the selected object, the game processing unit 320 performs processing matching a game program according to the operation or the instruction. When, for example, one or a plurality of objects are selected according to the input operation with respect to the touch screen 120 and then different coordinate information is inputted to the touch screen 120 again, the game processing unit 320 performs control of moving one or a plurality of selected objects to the coordinate information inputted again. Thus, the game processing unit 320 preferably advances a game by linking the card information acquired by the card reader 200 and the coordinate information inputted to the touch screen 120.

The audio processing unit 250 emits various sounds according to, for example, an instruction from the game processing unit 320.

Functions of the game processing unit 320, the image processing unit 330 and the audio processing unit 350 may all be realized by hardware or may all be realized by programs. Alternatively, these functions may be realized by both of the hardware and the programs.

As illustrated in FIG. 6, for example, the image processing unit 330 may have a geometry processing unit 332 (three-dimensional coordinate computing unit) and a drawing unit 340 (rendering unit).

The geometry processing unit 332 performs various geometry computations (three-dimensional coordinate computation) such as coordinate transformation, clipping processing, perspective transformation and light source calculation. Further, object data (for example, top coordinate, top texture coordinate or brightness data of the object) for which geometry processing has been performed (perspective transformation has been performed) is stored in a main memory 372 of the temporary memory unit 370 and kept.

The drawing unit 340 draws the object in a frame buffer 374 based on the object data for which geometry computation has been performed (perspective transformation has been performed) and a texture and the like stored in the texture memory unit 376. The drawing unit 340 may include, for example, a texture mapping unit 342 and a shading processing unit 344. More specifically, the drawing unit 340 can be implemented by a drawing processor. The drawing processor is connected to the texture memory unit, various tables, a frame buffer and a VRAM via a bus and the like, and is further connected with the display.

The texture mapping unit 242 reads an environment texture from the texture memory unit 276, and maps the read environment texture on the object.

The shading processing unit 344 performs shading processing with respect to the object. For example, the geometry processing unit 332 performs light source calculation, and calculates brightness (RGB) of each top of the object based on information about the light source for shading processing, an illumination model and a normal vector of each top of the object. The shading processing unit 344 calculates the brightness of each dot of a primitive surface (polygon or curved surface) based on the brightness of each top according to Phong shading or Gouraud shading.

The geometry processing unit 332 may include a normal vector processing unit 334. The normal vector processing unit 334 may perform processing of rotating a normal vector of each top of the object (a normal vector on a plane of the object in a broad sense) according to a rotation matrix from a local coordinate system to a world coordinate system.

The operating unit 360 allows a player to input operation data. The function of the operating unit 360 is realized by, for example, a lever, a button and hardware. Processing information from the operating unit 360 is transmitted to the main processor through a serial interface (I/F) or the bus.

The game information memory unit 380 stores game programs, objects displayed on the display 110 and information related to image data in game space. The game information memory unit 380 is, for example, a ROM, and is realized by a non-volatile memory such as an optical disk (CD or DVD), a magnetooptical disk (MO), a magnetic disk, a hard disk or a magnetic tape. The processing unit 310 performs various processing based on information stored in this game information memory unit 380. The game information memory unit 380 stores information (programs or the programs and data) for executing means (a block included in the processing unit 310 in particular) of the present invention (the present embodiment). Part or all of information stored in the game information memory unit 380 may be written to the temporary memory unit 370 when, for example, the system is turned on.

The information stored in the game information memory unit 380 includes, for example at least two of a program code for performing predetermined processing, image data, audio data, shape data of a display object, table data, list data, information for instructing processing of the present invention and information for performing processing according to the instruction. For example, the table data includes data of an object table which stores a status, a type, a name and an attribute of an object, and characteristics of the object matching the orientation or the position of the card, in association with an identification number of the object.

The status of the object is information in which, for example, a moving speed, a hit point, offense power and defense power are stored as numerical values. The game processing unit 320 can decide superiority and inferiority of, for example, the moving speed, the hit point and the offense power of each object by referring to the status stored in the object table. Further, the game processing unit 320 can perform various computations for advancing a game based on these numerical values related to the status. For example, the numerical value of the moving speed of each object is comparable, and, by referring to the object table, it is possible to learn which one of a given object and another object has a faster moving speed. Further, by performing predetermined computation processing based on a numerical value of the moving speed of each object, it is possible to calculate a time required for the object to move from a give point to another point in game space.

Furthermore, the characteristics of the object matching the orientation of the card are data which change according to the orientation of the card set on the panel 210 of the card reader 200. For example, as to objects related to a given card, the object table stores information which is different when the card is vertically set or horizontally set. For example, when the card is vertically set and horizontally set, the status of the object may change.

Further, the characteristics of the object matching the position of the card are data which change according to the position at which the card is set on the panel 210 of the card reader 200. For example, as to objects related to a given card, the object table stores information which is different when the card is positioned in the offensive area A1 (first area) and when the card is positioned in the defensive area A2 (second area). For example, when the card is positioned in the offensive area A1 and when the card is positioned in the defensive area A2, the status of the object may change.

Further, the game information memory unit 380 stores data related to game space. The game space means a world of a game in the game apparatus according to the present invention which is also referred to as a "world". The data related to the game space includes position information of a target object to be displayed, information related to the type of the target object to be displayed and image data of the target object to be displayed. The target object to be displayed is, for example, a background, a building, a landscape, a plant and an object appearing in a game. This image data is preferably stored as polygon data. The polygon data includes, for example, top coordinate data, color data, texture data and transparency data. The game information memory unit 380 classifies and stores a target object to be displayed according to the orientation of a view point, a position and an area of a player character.

The audio output unit 390 outputs an audio. The function of the audio output unit 390 can be realized by hardware such as a speaker. An audio output is applied audio processing by a sound processor connected to, for example, the main processor through the bus, and is outputted from the audio output unit such as the speaker.

The mobile information storage apparatus 392 stores, for example, personal data of a player and saved data. This mobile information storage apparatus 392 may be, for example, a memory card or a mobile game apparatus. A function of the mobile information storage apparatus 392 can be achieved by known storage means such as a memory card, a flash memory, a hard disk or a USB memory. Meanwhile, the mobile information storage apparatus 392 is not a necessary configuration, and may be implemented when a player needs to be identified.

The communication unit 394 is an arbitrary unit which performs various controls for performing communication with outside (for example, a host server or another game apparatus). By connecting the game apparatus with a host sever on a network or another game apparatus through the communication unit 394, it is possible to play a match play or a combination play of a game. The function of the communication unit 394 can be realized by various processors, hardware such as a communication ASIC or a program. Further, a program or data for executing a game apparatus may be distributed from an information storage medium of a host apparatus (server) to the game information memory unit 380 through the network and the communication unit 394.

[Operation Example of Game Apparatus]

Next, an operation example of the game apparatus employing the above configuration will be described with reference to FIGS. 9 to 11. Hereinafter, the system of the game executed by the game apparatus will be described using an example. For example, the game apparatus according to the present invention can play a match game using communication such as the Internet. In this match game, each game user plays a match by having a plurality of objects (game characters) to appear in one game space. In an example of the game described below, the user performs an instruction operation such as appearance, movement, offense and defense of each object through, for example, the touch panel display 100 and the card reader 200 to beat enemy objects (Enemy), conquer a tower and break a stone.

Figure 9:
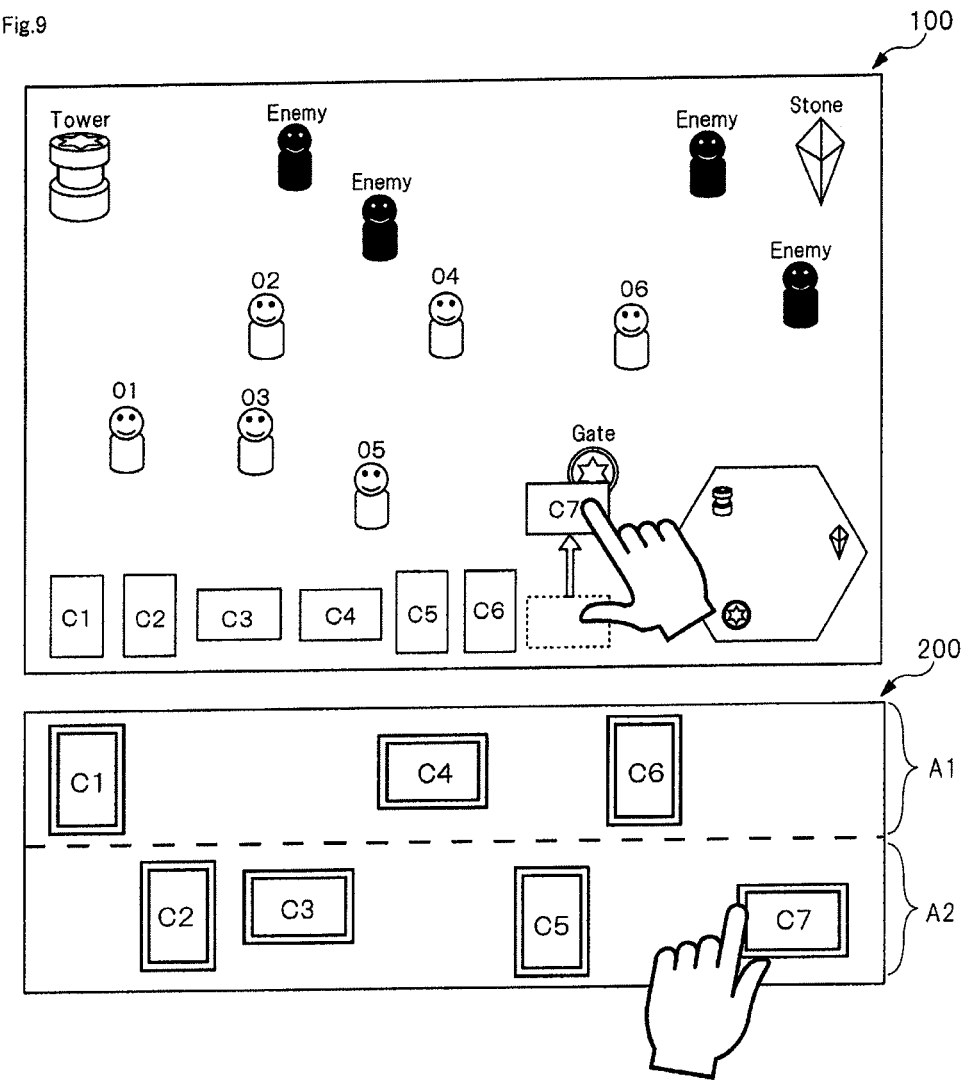
FIG. 9 is a perspective view illustrating an example of the outlook of the game apparatus according to the present invention.

FIG. 9 conceptually illustrates states of the touch panel display 100 and the card reader 200 when a game is actually played using the game apparatus according to the present invention. The user sets desired cards C1 to C7 on the card reader 200. The identification code is printed on the back surface of each of the cards C1 to C7. When reading the identification code of each of the cards C1 to C7, the card reader 200 analyzes card information based on the identification code, and transmits card information to the processing unit 310 of the game apparatus. Further, the card reader 200 can learn the orientation and the position of each of the cards C1 to C7. In an example illustrated in FIG. 9, on the card reader 200, the cards C1, C2, C5 and C6 are vertically set, and the cards C3, C4 and C7 are horizontally set. Further, in the example illustrated in FIG. 9, on the card reader 200, the cards C1, C4 and C6 are positioned in the offensive area A1, and the cards C2, C3, C5 and C7 are positioned in the defensive area A2. Information detected by the card reader 200 is transmitted to the processing unit 310, and the processing unit 310 refers to the object table stored in the game information memory unit 380 (or the temporary memory unit 370) based on the card information and information about, for example, the orientation of the card and the position of the card, and reads information (for example, image data and a status) about the object associated with the card information. The processing unit 310 has the touch panel display 100 display images based on the read image data. For example, the touch panel display 100 displays the images of the cards in a lower area of the touch panel display 100. The images of the cards displayed on the touch panel display 100 match an arrangement order of each of the cards C1 to C7 set on the card reader 200 and the orientation of each of the cards C1 to C7. Thus, by displaying the image of each of the cards C1 to C7 set on the card reader 200, on part of the touch panel display 100, the user can learn an arrangement and the orientation of each of the cards C1 to C7 by viewing the touch panel display 100 without visually checking the card reader 200. In addition, touch panel display 100 can display information regarding positions of each of the cards C1 to C7 set on the card reader 200 (for example, the card is positioned on the offensive area A1 or the defensive area A2).

In the example illustrated in FIG. 9, the objects (game characters) O1 to O6 associated with the cards C1 to C6 are displayed on the display screen of the touch panel display 100. Each object has a unique status, a type, a name, an attribute and object characteristics matching the orientation or the position of the card. The status of the object is information in which, for example, a moving speed, a hit point, offense power and defense power are stored as numerical values. These pieces of information are stored in the object table in association with identification information of each object. While it is possible to set objects the cards of which are vertically arranged to carry out normal offenses, it is possible to set objects the cards of which are horizontally arranged to carry out special offenses. Further, while it is possible to make a setting to increase numerical values of offence power of the objects the cards of which are positioned in the offensive area A1, it is possible to make a setting to increase numerical values of defense power of objects the cards of which are positioned in the defensive area A2. Furthermore, in the example illustrated in FIG. 9, the object (O7) associated with the card C7 is not displayed on the touch panel display 100. To allow the object (O7) to appear in game space, the image of the card C7 displayed on the touch panel display 100 is touched, and the image of the card C7 is dragged to the position at which a call gate is displayed. When the image of the card C7 is dropped at the position at which a call gate is displayed, the object (O7) associated with the card C7 appears in game space, and is displayed on the touch panel display 100. In addition, positional coordinates of the call gate in the game space are stored in the game information memory unit 380 or the temporary memory unit 370, and the game processing unit 320 get grip on the position of the call gate.

Figure 10A:
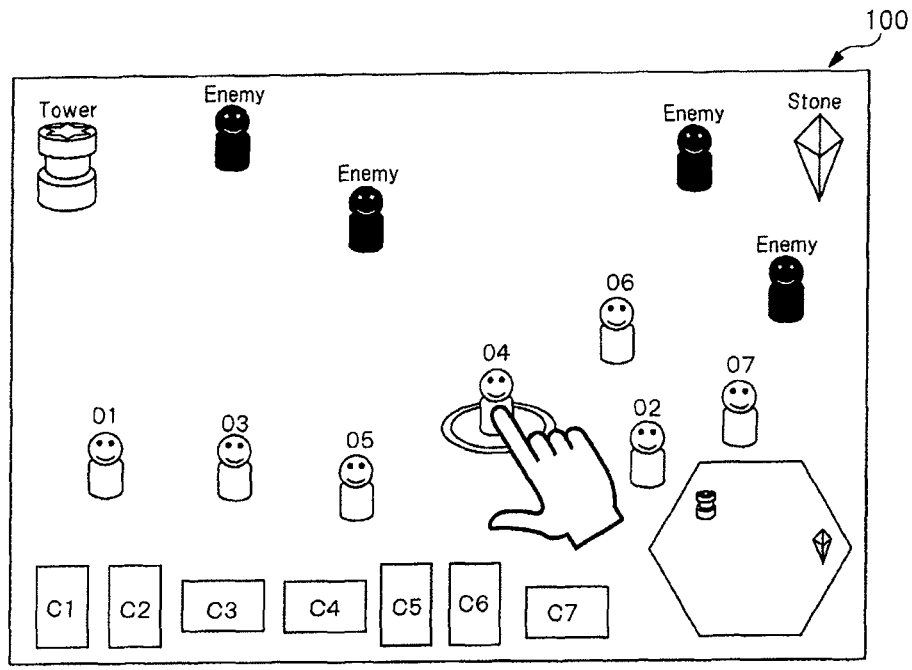
FIGS. 10(*a*) and 10(*b*) are a view for describing an example of a game executed by the game apparatus according to the present invention.

FIG. 10 illustrates an example of an operation of moving objects displayed on the touch panel display 100. When the user touches the touch panel display 100, the touch panel display 100 obtains the coordinate of the touch position. The processing unit 310 refers to the coordinate of the touch position and the coordinate at which the object is displayed, and decides whether or not the coordinate of the touch position and the coordinate at which the object is displayed match. When the touch position and the position of the object match, the processing unit 310 learns that the object is selected. In an example in FIG. 10(a), the object O4 is selected. Further, when the user touches the display screen of the touch panel display 100 in a state where the object O4 is selected, the processing unit 310 stores the coordinate of the touch position in the temporary memory unit. Particularly, when the user touches a plurality of points in a state where the object 4 is selected, the processing unit 310 stores the coordinates of the touch positions in the temporary memory unit together with information about the touch order. Further, the processing unit 310 performs processing of moving the object O4 touched and selected by the user to a point which the user touches next. The moving speed varies per object. Then, the processing unit 310 reads a numerical value of the moving speed related to the object O4 from the object table. Further, the object O4 is moved from the first point to a moving destination point based on the numerical value of the read moving speed. Furthermore, when a plurality of points is touched, the selected object O4 is sequentially moved to each point according to the order. In addition, when the moving object O4 encounters an enemy object during movement or arrives at a tower, processing of playing a match with the enemy object or processing of conquering the tower only need to be performed similar to the known game system.

Figure 10B:
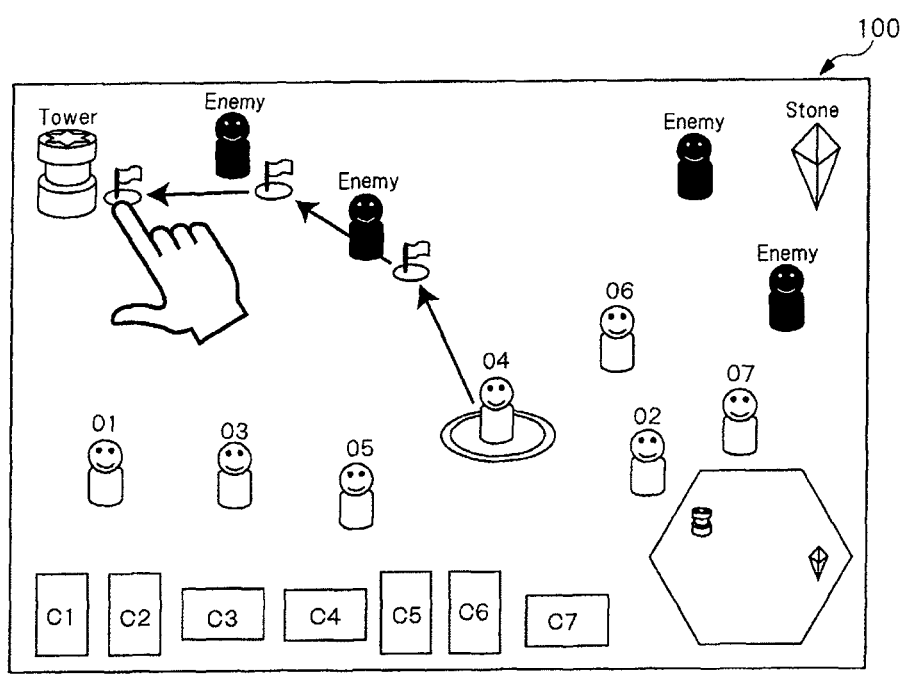

Meanwhile, when the user wishes to simultaneously move a plurality of objects, an operation of touching and selecting objects one by one and moving the objects according to the method illustrated in FIGS. 10(a) and 10(b) require that all objects need to be touched and selected one by one, and becomes complicated. Further, as described above, the moving speed varies per each object. Hence, even when the user wishes to move a plurality of objects to the same point, a timing when each object arrives at the specified point varies according to the moving speed of the object.

Figure 11A:
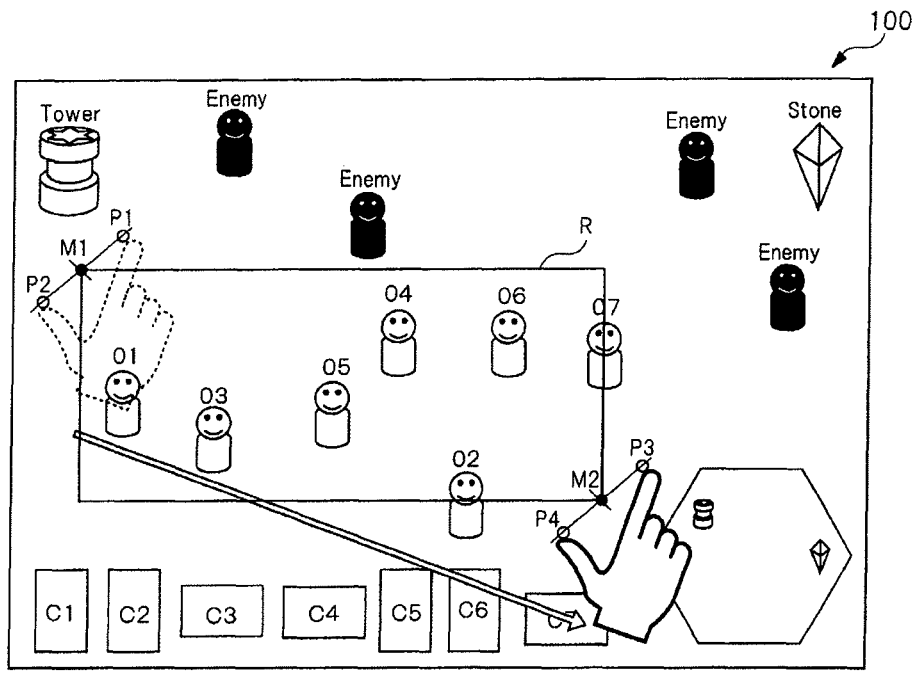
FIGS. 11(*a*) and 11(*b*) are a view for describing an example of a game executed by the game apparatus according to the present invention.
Figure 11B:
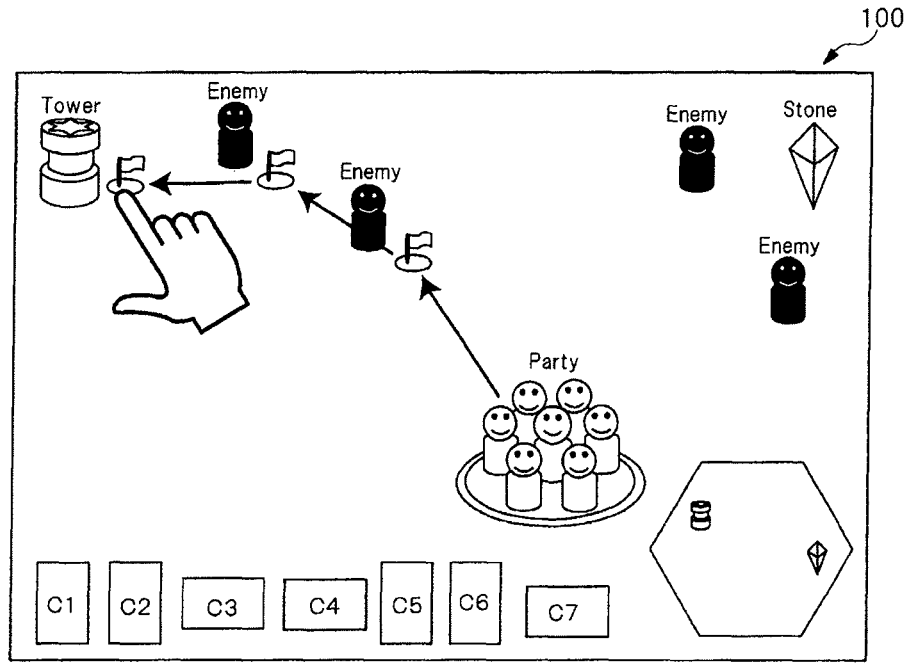

Hence, as illustrated FIGS. 11(a) and 11(b), the game system can collectively select a plurality of objects on the display screen, and can form a party of the selected objects. FIG. 11 (a) illustrates an example of an operation of collectively selecting a plurality of objects O1 to O7. In addition, the operation illustrated in FIG. 11(a) is basically the same as the operation illustrated in FIG. 3. The processing unit 310 determines the coordinate of the first intermediate point M1 calculated from coordinates of the first two points P1 and P2 based on the coordinates of the first two points P1 and P2 simultaneously inputted to the touch panel display 100 by the user. Further, the processing unit 310 determines the coordinate M2 of the second intermediate point calculated from coordinates of the last points P3 and P4 based on the coordinates of the last two points P3 and P4 detected immediately before the coordinates of the two points are dragged by the user and stop being simultaneously inputted. Furthermore, the processing unit 310 specifies a rectangular area on the display screen of the touch panel display 100 based on the coordinate of the first intermediate point M1 and the coordinate M2 of the second intermediate point. Still further, a plurality of displayed objects O1 to O7 is selected such that at least part of the objects is included in the specified rectangular area. The selected objects O1 to O7 are stored in the temporary memory unit in association with objects which form a party.

FIG. 11(b) illustrates an example where a plurality of selected objects O1 to O7 forms a party. As illustrated in FIG. 11(b), a plurality of collectively selected objects O1 to O7 gather at one site and form a party. Further, the processing unit 310 performs processing of moving the party formed by a user's operation to a point touched next. That is, the objects O1 to O7 form the party and move in a massing state. In this case, the moving speed of each object which forms the party is different from each other. Then, the processing unit 310 reads from the object table a numerical value of the moving speed of each object which forms a party, and calculates the moving speed of the party based on the numerical value of the read moving speed of each object. For example, the processing unit 310 only needs to calculate the slowest moving speed (the lowest numerical value) of each object which forms a party as the moving speed of the entire party. Further, the processing unit 310 may use an average value of moving speeds of a plurality of objects which form the party as the moving speed of the entire party. Furthermore, the processing unit 310 can also use the fastest moving speed (the highest numerical value) of each object which forms the party as the moving speed of the entire party. The party of the object moves to the specified point at the moving speed matching the value of the moving speed calculated by the processing unit 310. When a plurality of points is specified, the processing unit 310 moves the party of the objects sequentially to each point according to the specified order. When the moving party of the objects encounters an enemy object during movement or arrives at a tower, processing of playing a match with an enemy object or processing of conquering a tower only needs to be performed similar to a known game system.

A characteristic system of the game executed by the game apparatus according to the present invention has been mainly described above. A known game apparatus which has a card reader or a known game apparatus which has a touch panel display can be adequately applied to other game processing.

INDUSTRIAL APPLICABILITY

The present invention can be suitably used in, for example, a computer industry and a game industry.

REFERENCE SIGNS LIST

1 Display unit
2 Coordinate input unit
3 Area specifying unit
4 Object selecting unit
5 Object memory unit
6 Coordinate memory unit
10 Touch panel display
20 Control unit
30 Memory unit
M1 First intermediate point
M2 Second intermediate point
P1 Touch point of first point
P2 Touch point of second point
P3 Touch point of third point
P4 Touch point of fourth point
R Area
O Object

The invention claimed is:

1. A non-transitory computer readable storage medium that stores a computer program, the computer program, when executed by a processor, causing a computer apparatus to perform a process comprising:
   determining, when an input detected by a coordinate input is only a first input, the first input, wherein the coordinate input is configured to input a coordinate on a display screen which is configured to display images and the first input is a touch input provided on a touch panel display,
   determining whether a second input is provided while the first input is continuously provided on the touch panel display, the second input being a touch input provided on the touch panel display and different from the first input,
   executing a first execution operation when the second input is not provided within a first prescribed time period while the first input is continuously provided on the touch panel display,
   executing a second execution operation when the second touch input is determined to be provided while the first input is continuously provided on the touch panel display at a stationary position, the second execution operation being different from the first execution operation,
   executing a third execution operation when the first and the second inputs slide in a same direction while the first and the second inputs are continuously provided on the touch panel display, based on continuously detected coordinates of the first and the second inputs, the third execution operation being different from the first execution operation and the second execution operation, and
   executing the first execution operation, when the second input is provided while the first input is continuously provided on the touch panel display and one of the first and the second inputs is not continuously provided on the touch panel display for a second prescribed time period, based on a coordinate of the first or the second input which is continuously provided.

2. The non-transitory computer readable storage medium that stores the program in accordance with claim 1,
   wherein the process further comprises:
   specifying a corresponding point on the display screen based on a coordinate of the first or the second input, when the first execution operation is executed; and
   specifying a region on the display screen based on coordinates of the first and the second inputs, when the third execution operation is executed.

3. The non-transitory computer readable storage medium that stores the program in accordance with claim 1, wherein the third execution operation is performed after a sliding movement by the first and second inputs, and not before.

4. The non-transitory computer readable storage medium that stores the program in accordance with claim 1, wherein the third execution operation is performed only after a sliding movement by the first and second inputs is detected.

5. The non-transitory computer readable storage medium that stores the program in accordance with claim 1, wherein the same direction is a movement direction of a hand that provides the first input and the second input.

6. The non-transitory computer readable storage medium that stores the program in accordance with claim 1, execute a fourth execution operation when a sliding movement of the first input is detected while the first input is continuously provided on the touch panel display while the second touch input is determined not to be provided.

7. The non-transitory computer readable storage medium that stores the program in accordance with claim 6, wherein the fourth execution operation includes a movement of at least one virtual object.

8. The non-transitory computer readable storage medium that stores the program in accordance with claim 1, wherein the first execution operation includes selecting at least one virtual object displayed on the display screen in response to the first input.

9. The non-transitory computer readable storage medium that stores the program in accordance with claim 1, wherein the third execution operation enlarges an area corresponding to the first input.

10. The non-transitory computer readable storage medium that stores the program in accordance with claim 1, wherein the third execution operation performs a movement of at least one virtual object.

11. An information processing apparatus comprising:
a touch panel display configured to display an image;
a coordinate input configured to input a coordinate on a display screen of the touch panel display; and
a processor configured to:
determine, when an input detected by a coordinate input is only a first input, the first input, wherein the coordinate input is configured to input a coordinate on the display screen which is configured to display images and the first input is a touch input provided on the touch panel display,
determine whether a second input is provided while the first input is continuously provided on the touch panel display, the second input being a touch input provided on the touch panel display and different from the first input,
execute a first execution operation when the second input is not provided within a first prescribed time period while the first input is continuously provided on the touch panel display,
execute a second execution operation when the second touch input is determined to be provided while the first input is continuously provided on the touch panel display at a stationary position, the second execution operation being different from the first execution operation,
execute a third execution operation when the first and the second inputs slide in a same direction while the first and the second inputs are continuously provided on the touch panel display, based on continuously detected coordinates of the first and the second inputs, the third execution operation being different from the first execution operation and the second execution operation, and
execute the first execution operation, when the second input is provided while the first input is continuously provided on the touch panel display and one of the first and the second inputs is not continuously provided on the touch panel display for a second prescribed time period, based on a coordinate of the first or the second input which is continuously provided.

* * * * *